(12) United States Patent
Jiang

(10) Patent No.: US 12,157,512 B1
(45) Date of Patent: Dec. 3, 2024

(54) FOLDING CART

(71) Applicant: Zhongshan Kanglaiya Trade Co., Ltd., Zhongshan (CN)

(72) Inventor: Zelian Jiang, Zhongshan (CN)

(73) Assignee: Zhongshan Kanglaiya Trade Co., Ltd., Zhongshan (CN)

( * ) Notice: Subject to any disclaimer, the term of this patent is extended or adjusted under 35 U.S.C. 154(b) by 0 days.

(21) Appl. No.: 18/675,559

(22) Filed: May 28, 2024

(30) Foreign Application Priority Data

Apr. 28, 2024 (CN) .......................... 202420911481.0

(51) Int. Cl.
B62B 3/02 (2006.01)

(52) U.S. Cl.
CPC ............ B62B 3/02 (2013.01); *B62B 2205/24* (2013.01)

(58) Field of Classification Search
CPC ........ B62B 3/02; B62B 3/007; B62B 2205/24
See application file for complete search history.

(56) References Cited

U.S. PATENT DOCUMENTS

| | | | | |
|---|---|---|---|---|
| 9,145,154 | B1* | 9/2015 | Horowitz | B62B 5/0013 |
| 9,327,749 | B2* | 5/2016 | Young | B62B 5/08 |
| 9,440,668 | B1* | 9/2016 | Chen | B62B 5/0013 |
| 9,855,962 | B1* | 1/2018 | Chen | B62B 3/025 |
| 11,772,698 | B2* | 10/2023 | Cui | B62B 7/008 |
| | | | | 280/650 |
| 2010/0090444 | A1* | 4/2010 | Chen | B62B 3/106 |
| | | | | 280/651 |
| 2010/0156069 | A1* | 6/2010 | Chen | B62B 9/142 |
| | | | | 280/639 |
| 2015/0035258 | A1* | 2/2015 | Chen | B62B 3/007 |
| | | | | 280/651 |
| 2018/0297622 | A1* | 10/2018 | Chen | B62B 5/0003 |
| 2021/0107548 | A1* | 4/2021 | Wang | B62B 3/007 |
| 2021/0107549 | A1* | 4/2021 | Wang | B62B 3/007 |
| 2022/0097748 | A1* | 3/2022 | Ma | B62B 5/0433 |
| 2023/0219608 | A1* | 7/2023 | Jiang | B62B 3/025 |
| | | | | 280/651 |

FOREIGN PATENT DOCUMENTS

| | | |
|---|---|---|
| CN | 1922067 A | 2/2007 |
| CN | 213228833 U | 5/2021 |
| CN | 215851299 U | 2/2022 |
| CN | 220009861 U | 11/2023 |

* cited by examiner

*Primary Examiner* — Brian L Swenson
(74) *Attorney, Agent, or Firm* — Jeenam Park

(57) ABSTRACT

The present disclosure provides a folding cart, including a front frame, a rear frame and a side frame, wherein a front end of a front inclined rod is pivotally connected to a lower side of a front frame, and a rear end of a rear inclined rod is pivotally connected to a lower side of a rear frame. A pivoting mechanism is respectively connected to a rear end of a front top rod, a front end of a rear top rod, a rear end of the front inclined rod, and a front end of the rear inclined rod, and enables the four to be pivotally connected to each other. According to the present disclosure, the overall structural strength and folding stability of the folding cart are improved, and use requirements of a user can be guaranteed to a maximum extent.

9 Claims, 6 Drawing Sheets

FOLDING CART

CROSS-REFERENCE TO RELATED APPLICATIONS

The application claims priority to Chinese patent application No. 202420911481.0, filed on Apr. 28, 2024, the entire contents of which are incorporated herein by reference.

TECHNICAL FIELD

The present disclosure relates to the technical field of carts, and in particular, to a folding cart.

BACKGROUND

Folding carts are favored by consumers because they are foldable and easy to carry and accommodate. However, a foldable structural design inevitably leads to a cart with structural strength inferior to that adopting a rigid connection. For example, the patent CN216374594U discloses a folding bicycle, including a bottom support, at least two sets of side supports, and a plurality of support rods, where the plurality of support rods are vertically arranged and located at an edge of the folding bicycle, and the bottom support is movably connected to the support rods. There is no corresponding structural connection between the side support and the support rod of the folding cart, and overall structural strength and stability are poor. Therefore, how to improve the structural strength and load bearing capability of the folding cart to ensure use requirements of a user to a maximum extent is of great significance.

SUMMARY

In view of technical problems of poor structural strength and stability of an existing folding cart mentioned in the present disclosure, the present disclosure provides a folding cart. The folding cart is provided with a front inclined rod and a rear inclined rod, increasing supporting strength between a side frame and a front frame and between a side frame and a rear frame, and a front top rod, a rear top rod, a front inclined rod, and a rear inclined rod are pivotally connected to each other through a pivoting mechanism, so that stability of folding deformation is improved. According to the present disclosure, the overall structural strength and folding stability of the folding cart are improved, and use requirements of a user can be guaranteed to a maximum extent.

A folding cart includes a front frame and a rear frame arranged front and back, and a side frame arranged between the front frame and the rear frame for unfolding and folding, where the side frame at least includes a front top rod, a front bottom rod, a rear top rod, a rear bottom rod, a front inclined rod, a rear inclined rod, and a pivoting mechanism;

a front end of each of the front top rod and the front bottom rod is respectively pivotally connected to an upper side and a lower side of the front frame, a rear end of each of the rear top rod and the rear bottom rod is respectively pivotally connected to an upper side and a lower side of the rear frame, a rear end of the front bottom rod is pivotally connected to a front end of the rear bottom rod, a front end of the front inclined rod is pivotally connected to a lower side of the front frame, and a rear end of the rear inclined rod is pivotally connected to a lower side of the rear frame; and the pivoting mechanism is respectively connected to a rear end of the front top rod, a front end of the rear top rod, a rear end of the front inclined rod, and a front end of the rear inclined rod, and enables the four to be pivotally connected to each other.

According to the folding cart as described above, the pivoting mechanism is pivotally connected to the front top rod through a front top pivot seat, and a front side of the front top pivot seat is pivotally connected to the rear end of the front top rod, and a rear side of the front top pivot seat is pivotally connected to the pivoting mechanism; and the pivoting mechanism is pivotally connected to the rear top rod through a rear top pivot seat, and a rear side of the rear top pivot seat is pivotally connected to the front end of the rear top rod, and a front side of the rear top pivot seat is pivotally connected to the pivoting mechanism.

According to the folding cart as described above, the pivoting mechanism includes a front top joint, a rear top joint, a front inclined joint, and a rear inclined joint that are pivotally connected to each other;

the front top joint is pivotally connected to the rear side of the front top pivot seat;

the rear top joint is pivotally connected to the front side of the rear top pivot seat;

the front inclined joint is connected to the rear end of the front inclined rod; and the rear inclined joint is connected to the front end of the rear inclined rod.

According to the folding cart as described above, when the folding cart is in an unfolded state, the front top joint and the rear top joint are transversely arranged, and the front inclined joint and the rear inclined joint are obliquely arranged; and when the folding cart is folded from the unfolded state to a folded state, the front top joint and the rear top joint rotate around a pivot joint to an end away from the pivot joint and gradually approach upwards, and the front inclined joint and the rear inclined joint rotate around the pivot joint to an end away from the pivot joint and gradually approach downwards.

According to the folding cart as described above, the pivoting mechanism further includes a pivoting shaft that pivotally connects the front inclined joint, the rear inclined joint, the front top joint, and the rear top joint after passing through the four in sequence.

According to the folding cart as described above, the front top pivot seat is provided with a front support rod extending downwards to be pivotally connected to the front bottom rod; and the rear top pivot seat is provided with a rear support rod extending downwards to be pivotally connected to the rear bottom rod.

According to the folding cart as described above, the front support rod and the rear support rod are vertically arranged, and when the folding cart is folded from the unfolded state to the folded state, the front top pivot seat and the rear top pivot seat are kept transversely arranged, and the front support rod and the rear support rod are kept vertically arranged.

According to the folding cart as described above, the rear end of the front bottom rod is provided with a front bottom pivot pipe, the front end of the rear bottom rod is provided with a rear bottom pivot seat, the rear bottom pivot seat is pivotally connected to the middle of the front bottom pivot pipe, and when the folding cart is in the unfolded state, the front bottom pivot pipe abuts against an upper side face of the rear bottom rod.

According to the folding cart as described above, the front frame includes a front upright rod, an upper side and a lower side of the front upright rod are respectively provided with a front upper pivot seat and a front lower pivot seat, the front upper pivot seat is pivotally connected to the front end of the front top rod, and the front lower pivot seat is pivotally connected to a front end of each of the front bottom rod and the front inclined rod, respectively; and the rear frame includes a rear upright rod, an upper side and a lower side of the rear upright rod are respectively provided with a rear upper pivot seat and a rear lower pivot seat, the rear upper pivot seat is pivotally connected to the rear end of the rear top rod, and the rear lower pivot seat is pivotally connected to a rear end of each of the rear bottom rod and the rear inclined rod, respectively.

According to the folding cart as described above, the rear inclined rod is provided with a folding hook, the front inclined rod is provided with a folding buckle, and when the folding cart is in the folded state, the folding hook can be locked on the front inclined rod through the folding buckle, enabling the folding cart to be kept in the folded state.

Implementation of embodiments of the present disclosure has the following beneficial effects:

The present disclosure provides a folding cart, including a front frame and a rear frame arranged front and back, and a side frame arranged between the front frame and the rear frame for unfolding and folding, where the side frame includes a front top rod, a front bottom rod, a rear top rod, a rear bottom rod, a front inclined rod, a rear inclined rod, and a pivoting mechanism. A front end of the front inclined rod is pivotally connected to a lower side of the front frame, and a rear end of the rear inclined rod is pivotally connected to a lower side of the rear frame. The pivoting mechanism is respectively connected to a rear end of the front top rod, a front end of the rear top rod, a rear end of the front inclined rod, and a front end of the rear inclined rod, and enables the four to be pivotally connected to each other. The front inclined rod and the rear inclined rod increase supporting strength between the side frame and the front frame and between the side frame and the rear frame, and the front top rod, the rear top rod, the front inclined rod, and the rear inclined rod are pivotally connected to each other through the pivoting mechanism, so that stability of folding deformation is improved. According to the present disclosure, the overall structural strength and folding stability of the folding cart are improved, and use requirements of a user can be guaranteed to a maximum extent.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Figure 1:
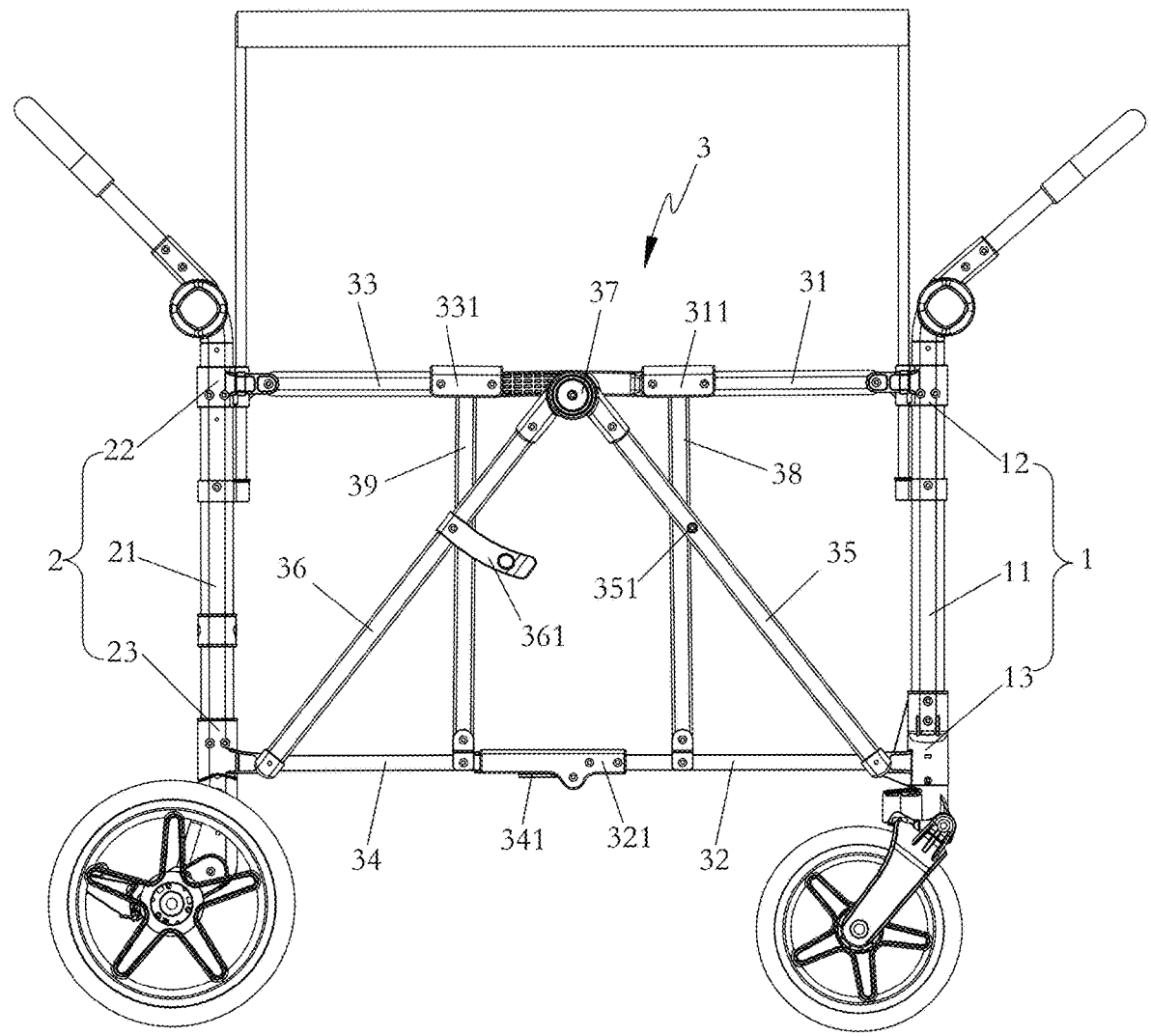
FIG. 1 is a schematic structural diagram of a folding cart in an unfolded state according to an embodiment of the present disclosure.

The following clearly and completely describes the technical solutions in the embodiments of the present disclosure with reference to the accompanying drawings in the embodiments of the present disclosure. Apparently, the described embodiments are only a part rather than all of the embodiments of the present disclosure. All other embodiments obtained by a person of ordinary skill in the art based on the embodiments of the present disclosure in without creative efforts shall fall within the protection scope of the present disclosure.

As shown in FIG. 1 to FIG. 6, a folding cart includes a front frame 1 and a rear frame 2 arranged front and back, and a side frame 3 arranged between the front frame and the rear frame for unfolding and folding. Two sets of the side frames 3 are symmetrically arranged on left and right rides of the front frame 1 and the rear frame 2. The side frame 3 at least includes a front top rod 31, a front bottom rod 32, a rear top rod 33, a rear bottom rod 34, a front inclined rod 35, a rear inclined rod 36, and a pivoting mechanism 37. A front end of each of the front top rod 31 and the front bottom rod 32 is respectively pivotally connected to an upper side and a lower side of the front frame 1, a rear end of each of the rear top rod 33 and the rear bottom rod 34 is respectively pivotally connected to an upper side and a lower side of the rear frame 2, a rear end of the front bottom rod 32 is pivotally connected to a front end of the rear bottom rod 34, a front end of the front inclined rod 35 is pivotally connected to a lower side of the front frame 1, and a rear end of the rear inclined rod 36 is pivotally connected to a lower side of the rear frame 2; and the pivoting mechanism 37 is respectively connected to a rear end of the front top rod 31, a front end of the rear top rod 33, a rear end of the front inclined rod 35, and a front end of the rear inclined rod 36, and enables the four to be pivotally connected to each other. The folding cart is provided with the front inclined rod and the rear inclined rod, increasing supporting strength between the side frame and the front frame and between the side frame and the rear frame, and the front top rod, the rear top rod, the front inclined rod, and the rear inclined rod are pivotally connected to each other through the pivoting mechanism, so that stability of folding deformation is improved. According to the present disclosure, the overall structural strength and folding stability of the folding cart are improved, and use requirements of a user can be guaranteed to a maximum extent.

Further, the pivoting mechanism 37 is pivotally connected to the front top rod 31 through a front top pivot seat 311, and a front side of the front top pivot seat 311 is pivotally connected to a rear end of the front top rod 31, and a rear side of the front top pivot seat is pivotally connected to the pivoting mechanism 37. In the embodiments of the present disclosure, the front top pivot seat 311 is pivotally connected to the rear end of the front top rod 31 and a front side of a front top joint 371 on the pivoting mechanism 37, respectively, so that the pivoting mechanism 37 is pivotally connected to the front top rod 31, and folding smoothness and stability is improved.

Further, the pivoting mechanism 37 is pivotally connected to the rear top rod 33 through a rear top pivot seat 331, and a rear side of the rear top pivot seat 331 is pivotally connected to a front end of the rear top rod 33, and a front side of the rear top pivot seat is pivotally connected to the pivoting mechanism 37. In the embodiments of the present disclosure, the rear top pivot seat 331 is pivotally connected to the front end of the rear top rod 33 and a rear side of a rear top joint 372 on the pivoting mechanism 37, respectively, so that the pivoting mechanism 37 is pivotally connected to the rear top rod 33, and folding smoothness and stability is improved.

Still further, the pivoting mechanism 37 includes the front top joint 371, the rear top joint 372, a front inclined joint 373, and a rear inclined joint 374 that are pivotally connected to each other, where the front top joint 371 is pivotally connected to a rear side of the front top pivot seat 311, the rear top joint 372 is pivotally connected to a front side of the rear top pivot seat 331, the front inclined joint 373 is connected to a rear end of the front inclined rod 35, and the rear inclined joint 374 is connected to a front end of the rear inclined rod 36. According to the present disclosure, by using the front top joint 371, the rear top joint 372, the front inclined joint 373, and the rear inclined joint 374 on the pivoting mechanism 37, the front top rod, the rear top rod, the front inclined rod, and the rear inclined rod are pivotally connected to each other, respectively, so that the stability of folding deformation is improved, and the overall connectivity is stronger.

Figure 2:
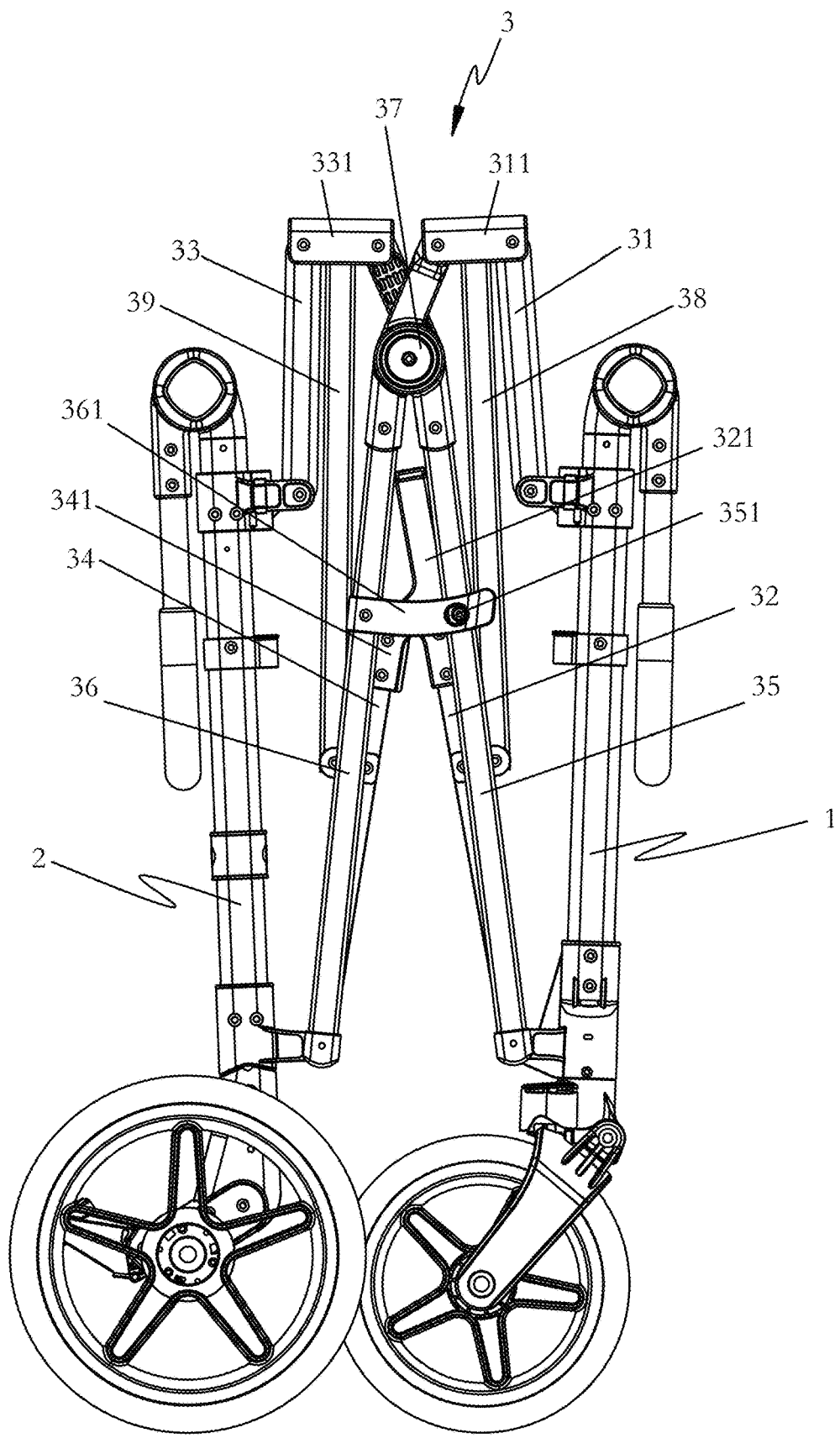
FIG. 2 is a schematic structural diagram of a folding cart in a folded state according to an embodiment of the present disclosure.
Figure 3:
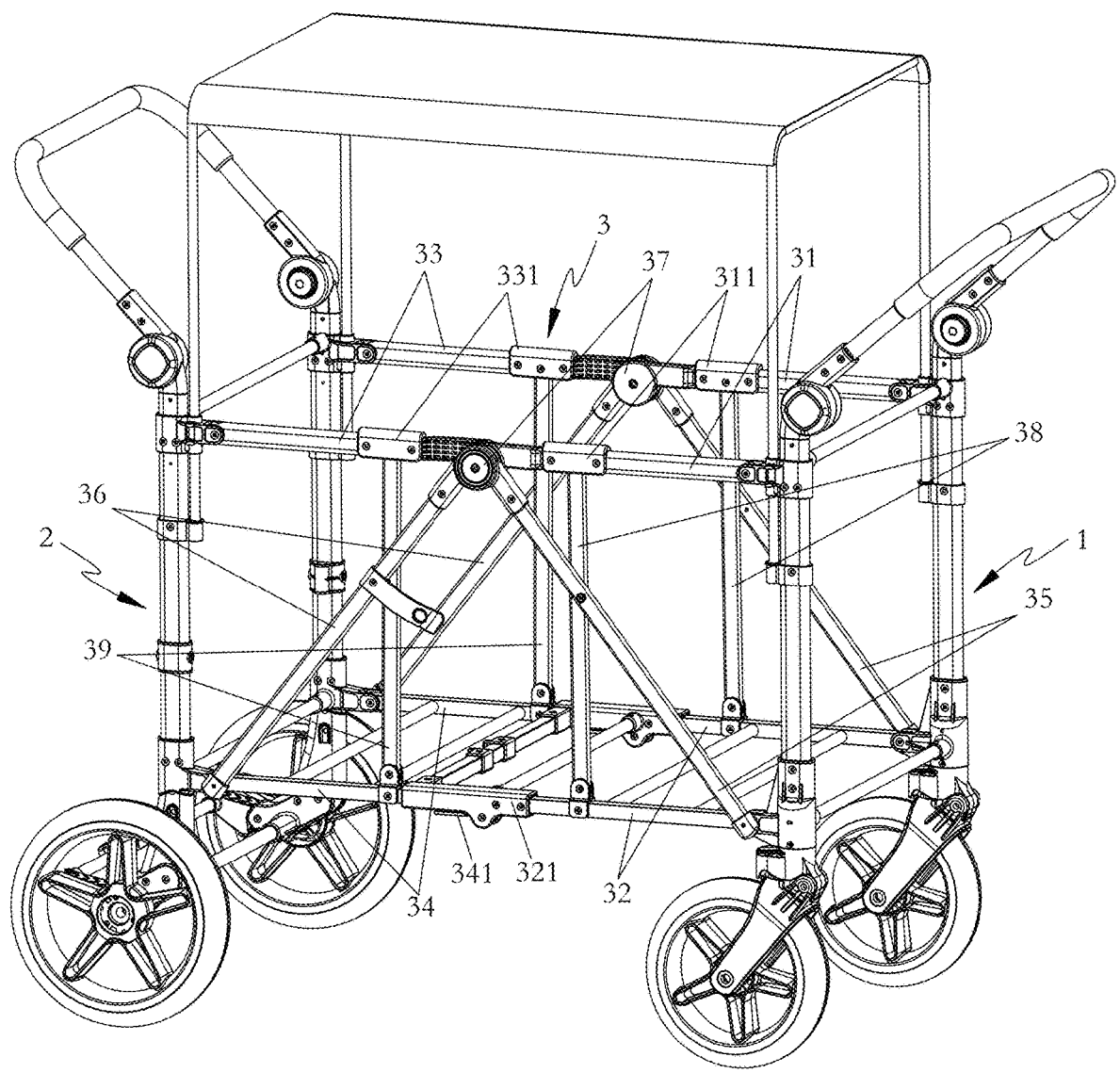
FIG. 3 is a perspective view of a folding cart in an unfolded state according to an embodiment of the present disclosure.
Figure 4:
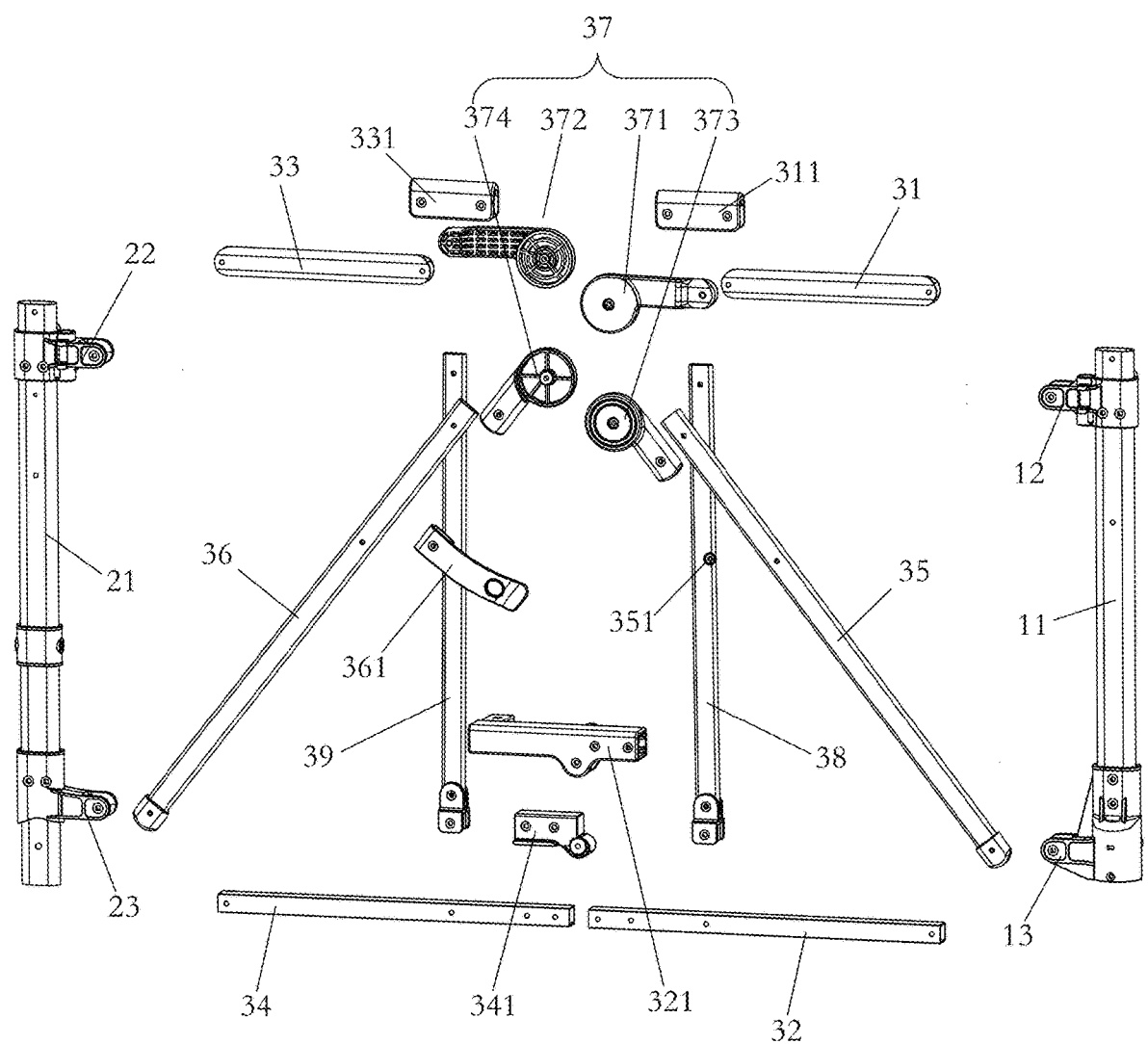
FIG. 4 is a partially exploded view of a folding cart according to an embodiment of the present disclosure.
Figure 5:
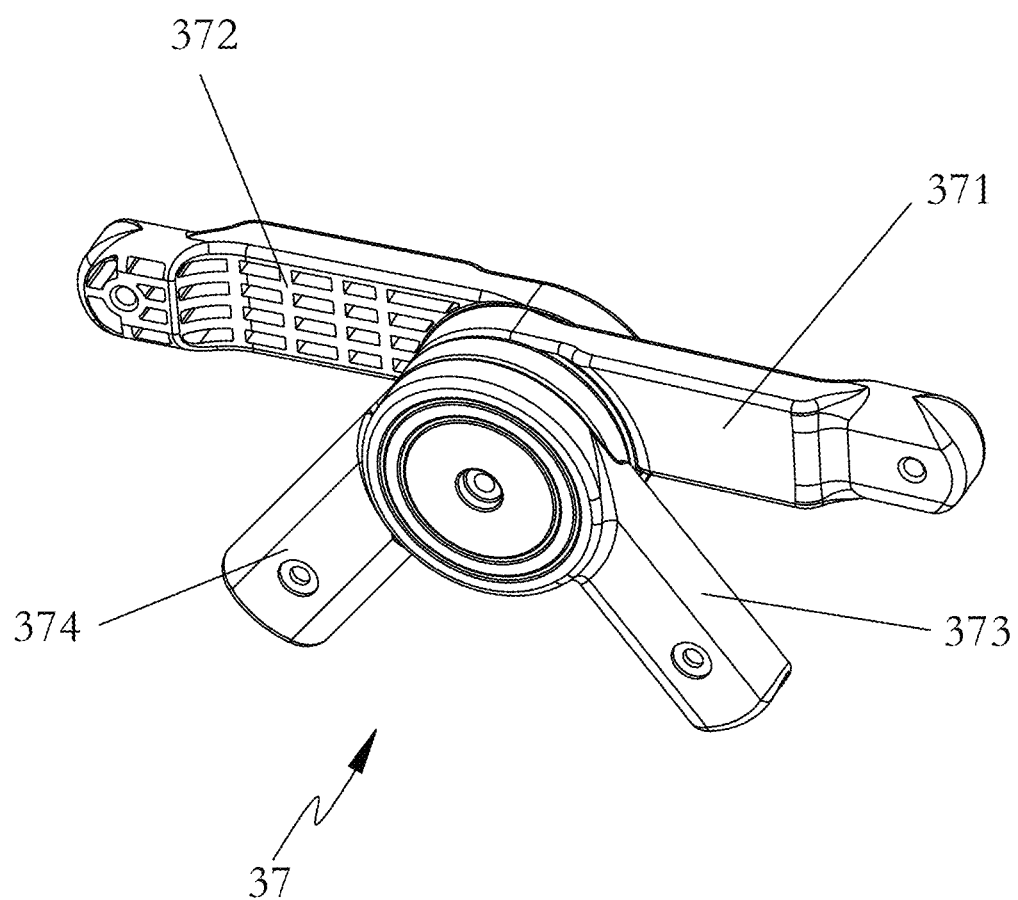
FIG. 5 is a schematic structural diagram of a pivoting mechanism in an unfolded state according to an embodiment of the present disclosure.
Figure 6:
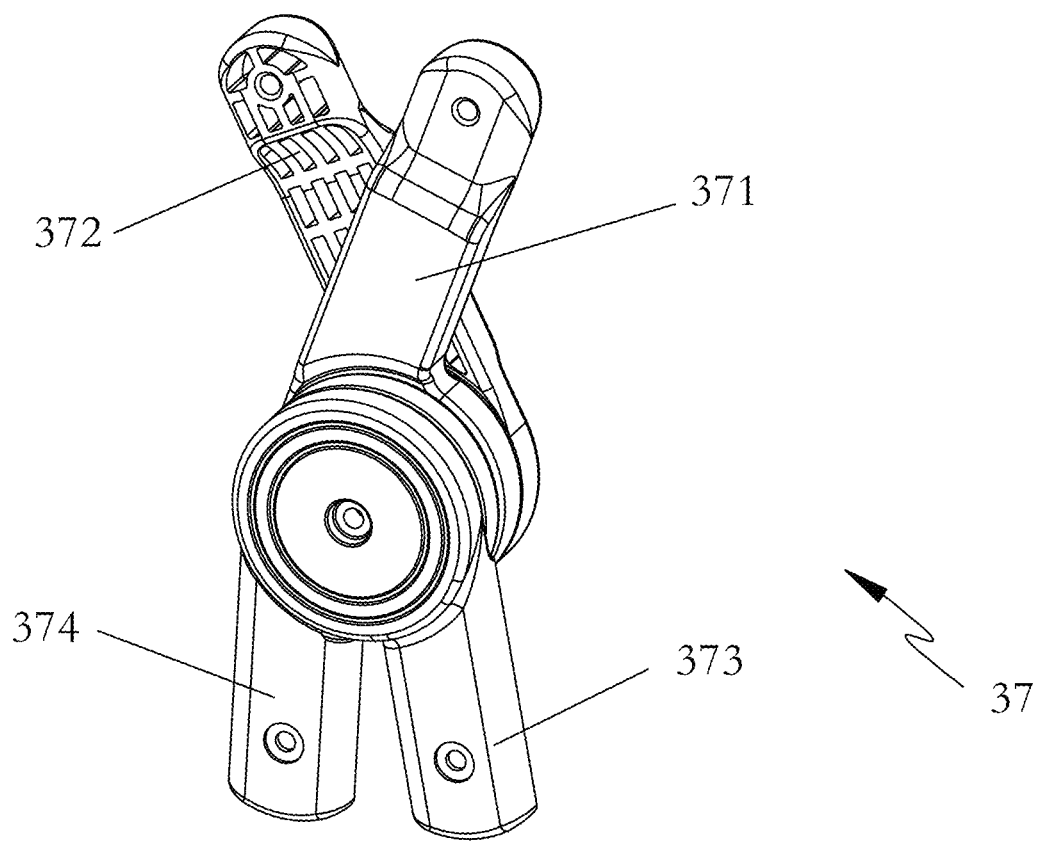
FIG. 6 is a schematic structural diagram of a pivoting mechanism in a folded state according to an embodiment of the present disclosure.

Still further, as shown in FIG. 1 and FIG. 5, when the folding cart is in an unfolded state, the front top joint 371 and the rear top joint 372 are transversely arranged, and the front inclined joint 373 and the rear inclined joint 374 are obliquely arranged. According to the present disclosure, the front top joint 371 and the rear top joint 372 are in the same horizontal state with the front top rod 31 and the rear top rod 33 when in an unfolded state, so that an upper end of the side frame 3 is a plane, the front inclined joint 373 extends obliquely towards a front lower side to be connected to the front inclined rod 35, and the rear inclined joint 374 extends obliquely towards a rear lower side to be connected to the rear inclined rod 36. When the folding cart is folded from the unfolded state to a folded state, as shown in FIG. 2 and FIG. 6, the front top joint 371 and the rear top joint 372 rotate around a pivot joint to an end away from the pivot joint and gradually approach upwards, and the front inclined joint 373 and the rear inclined joint 374 rotate around the pivot joint to an end away from the pivot joint and gradually approach downwards. In this case, the pivoting mechanism 37 is in an "X" shape, and in this case, the front frame 1 and the rear frame 2 are close to each other for folding. According to the present disclosure, stability of folding is improved through arrangement of the pivoting mechanism 37.

Further preferably, the pivoting mechanism 37 further includes a pivoting shaft (not shown in the figure) that pivotally connects the front inclined joint 373, the rear inclined joint 374, the front top joint 371, and the rear top joint 372 after passing through the four in sequence. The pivoting shaft may be a common fastener in the art, such as a bolt. The front inclined joint 373, the rear inclined joint 374, the front top joint 371, and the rear top joint 372 are connected in sequence through the pivoting shaft to form a coaxial rotational connection relationship, so as to facilitate synchronous folding and improve folding stability and structure stability.

Further, the front top pivot seat 311 is provided with a front support rod 38 extending downwards to be pivotally connected to the front bottom rod 32; and the rear top pivot seat 331 is provided with a rear support rod 39 extending downwards to be pivotally connected to the rear bottom rod 34. Through the front support rod 38 and the rear support rod 39, connection stability of the side frame 3 can be further improved, and structural strength of a product can be improved.

Still further, the front support rod 38 and the rear support rod 39 are vertically arranged, and when the folding cart is folded from an unfolded state to a folded state, as shown in FIG. 2, the front top pivot seat 311 and the rear top pivot seat 331 are kept transversely arranged, and the front support rod 38 and the rear support rod 39 are kept vertically arranged. According to the present disclosure, the front top pivot seat 311 and the rear top pivot seat 331 serve as an intermediate connection. In a folded state, the front support rod 38 and the rear support rod 39 can also be kept in a vertical state, and play a supporting role between a top rod and a bottom rod, thereby improving the overall structural strength of the product.

As a further preferred implementation, the rear end of the front bottom rod 32 is provided with a front bottom pivot pipe 321, the front end of the rear bottom rod 34 is provided with a rear bottom pivot seat 341, the rear bottom pivot seat 341 is pivotally connected to the middle of the front bottom pivot pipe 321, and when the folding cart is in the unfolded state, the front bottom pivot pipe 321 abuts against an upper side face of the rear bottom rod 34. According to the present disclosure, the rear bottom rod 34 is pivotally connected to the front bottom pivot pipe 321 on the front bottom rod 32 through the rear bottom pivot seat 341 thereon. In this way, the rear bottom rod 34 is pivotally connected to the front bottom rod 32. In a specific embodiment of the present disclosure, when the front bottom pivot pipe 321 is in an unfolded state, the front bottom pivot pipe can be sleeved on the rear bottom rod 34, and an inner wall of the front bottom pivot pipe 321 is tightly attached to an upper surface of the rear bottom rod 34. With this design, the rear bottom rod 34 and the front bottom rod 32 are kept in the same horizontal state, so that a bottom frame is more stable, and the structural strength of the product is improved.

Further, the front frame 1 includes a front upright rod 11, an upper side and a lower side of the front upright rod 11 are respectively provided with a front upper pivot seat 12 and a front lower pivot seat 13, the front upper pivot seat 12 is pivotally connected to the front end of the front top rod 31, and the front lower pivot seat 13 is pivotally connected to a front end of each of the front bottom rod 32 and the front inclined rod 35, respectively. In a specific embodiment of the present disclosure, the front upper pivot seat 12 and the front lower pivot seat 13 are respectively sleeved on the front upright rod 11, and are respectively hinged to the front top rod 31, the front bottom rod 32 and the front inclined rod 35 through a hinge portion, thereby improving stability of the product.

Further, the rear frame 2 includes a rear upright rod 21, an upper side and a lower side of the rear upright rod 21 are respectively provided with a rear upper pivot seat 22 and a rear lower pivot seat 23, the rear upper pivot seat 22 is pivotally connected to the rear end of the rear top rod 33, and the rear lower pivot seat 23 is pivotally connected to a rear end of each of the rear bottom rod 34 and the rear inclined rod 36, respectively. In a specific embodiment of the present disclosure, the rear upper pivot seat 22 and the rear lower pivot seat 23 are respectively sleeved on the rear upright rod 21, and are respectively hinged to the rear top rod 33, the rear bottom rod 34 and the rear inclined rod 36 through the hinge portion, thereby improving the stability of the product.

As a preferred implementation of the present disclosure, as shown in FIG. 2, the rear inclined rod 36 is provided with a folding hook 361, and the front inclined rod 35 is provided with a folding buckle 351. When the folding cart is in a folded state, the folding hook 361 can be locked on the front inclined rod 35 through the folding buckle 351, enabling the folding cart to be kept in the folded state. After the folding is completed, a fixed connection can be formed between the rear inclined rod 36 and the front inclined rod 35 through the folding hook 361, so as to keep the folding cart in the folded state.

Preferred implementations of the present disclosure are described above. It should be noted that a person of ordinary skill in the art may further make several improvements and variations without departing from the principle of the present disclosure, and these improvements and variations are also considered to be within the protection scope of the present disclosure.

What is claimed is:

1. A folding cart, comprising a front frame and a rear frame arranged front and back, and a side frame arranged between the front frame and the rear frame for unfolding and folding, wherein the side frame at least comprises a front top rod, a front bottom rod, a rear top rod, a rear bottom rod, a front inclined rod, a rear inclined rod, and a pivoting mechanism;
   a front end of each of the front top rod and the front bottom rod is respectively pivotally connected to an upper side and a lower side of the front frame, a rear end of each of the rear top rod and the rear bottom rod is respectively pivotally connected to an upper side and a lower side of the rear frame, a rear end of the front bottom rod is pivotally connected to a front end of the rear bottom rod, a front end of the front inclined rod is pivotally connected to the lower side of the front frame, and a rear end of the rear inclined rod is pivotally connected to the lower side of the rear frame; and
   the pivoting mechanism is respectively pivotally connected to a rear end of the front top rod, a front end of the rear top rod, a rear end of the front inclined rod, and a front end of the rear inclined rod, and enables the four to be pivotally connected to each other;
   wherein the pivoting mechanism is pivotally connected to the front top rod through a front top pivot seat, and a front side of the front top pivot seat is pivotally connected to the rear end of the front top rod, and a rear side of the front top pivot seat is pivotally connected to the pivoting mechanism; and
   the pivoting mechanism is pivotally connected to the rear top rod through a rear top pivot seat, and a rear side of the rear top pivot seat is pivotally connected to the front end of the rear top rod, and a front side of the rear top pivot seat is pivotally connected to the pivoting mechanism.

2. The folding cart according to claim 1, wherein the pivoting mechanism comprises a front top joint, a rear top joint, a front inclined joint, and a rear inclined joint that are pivotally connected to each other;
   the front top joint is pivotally connected to a rear side of the front top pivot seat;
   the rear top joint is pivotally connected to a front side of the rear top pivot seat;
   the front inclined joint is connected to the rear end of the front inclined rod; and
   the rear inclined joint is connected to the front end of the rear inclined rod.

3. The folding cart according to claim 2, wherein when the folding cart is in an unfolded state, the front top joint and the rear top joint are transversely arranged, and the front inclined joint and the rear inclined joint are obliquely arranged; and
   when the folding cart is folded from the unfolded state to a folded state, the front top joint and the rear top joint rotate around a pivot joint to an end away from the pivot joint and gradually approach upwards, and the front inclined joint and the rear inclined joint rotate around the pivot joint to an end away from the pivot joint and gradually approach downwards.

4. The folding cart according to claim 2, wherein the pivoting mechanism further comprises a pivoting shaft that pivotally connects the front inclined joint, the rear inclined joint, the front top joint, and the rear top joint after passing through the four in sequence.

5. The folding cart according to claim 1, wherein the front top pivot seat is provided with a front support rod extending downwards to be pivotally connected to the front bottom rod; and
   the rear top pivot seat is provided with a rear support rod extending downwards to be pivotally connected to the rear bottom rod.

6. The folding cart according to claim 5, wherein the front support rod and the rear support rod are vertically arranged, and when the folding cart is folded from an unfolded state to a folded state, the front top pivot seat and the rear top pivot seat are kept transversely arranged, and the front support rod and the rear support rod are kept vertically arranged.

7. The folding cart according to claim 1, wherein the front frame comprises a front upright rod, an upper side and a lower side of the front upright rod are respectively provided with a front upper pivot seat and a front lower pivot seat, the front upper pivot seat is pivotally connected to the front end of the front top rod, and the front lower pivot seat is pivotally connected to the front end of each of the front bottom rod and the front inclined rod, respectively; and
   the rear frame comprises a rear upright rod, an upper side and a lower side of the rear upright rod are respectively provided with a rear upper pivot seat and a rear lower pivot seat, the rear upper pivot seat is pivotally connected to the rear end of the rear top rod, and the rear lower pivot seat is pivotally connected to the rear end of each of the rear bottom rod and the rear inclined rod, respectively.

8. A folding cart, comprising a front frame and a rear frame arranged front and back, and a side frame arranged between the front frame and the rear frame for unfolding and folding, wherein the side frame at least comprises a front top rod, a front bottom rod, a rear top rod, a rear bottom rod, a front inclined rod, a rear inclined rod, and a pivoting mechanism;
   a front end of each of the front top rod and the front bottom rod is respectively pivotally connected to an upper side and a lower side of the front frame, a rear end of each of the rear top rod and the rear bottom rod is respectively pivotally connected to an upper side and a lower side of the rear frame, a rear end of the front bottom rod is pivotally connected to a front end of the rear bottom rod, a front end of the front inclined rod is pivotally connected to the lower side of the front frame, and a rear end of the rear inclined rod is pivotally connected to the lower side of the rear frame; and the pivoting mechanism is respectively connected to a rear end of the front top rod, a front end of the rear top rod, a rear end of the front inclined rod, and a front end of the rear inclined rod, and enables the four to be pivotally connected to each other;

wherein the rear end of the front bottom rod is provided with a front bottom pivot pipe, the front end of the rear bottom rod is provided with a rear bottom pivot seat, the rear bottom pivot seat is pivotally connected to the middle of the front bottom pivot pipe, and when the folding cart is in the unfolded state, the front bottom pivot pipe abuts against an upper side face of the rear bottom rod.

9. A folding cart, comprising a front frame and a rear frame arranged front and back, and a side frame arranged between the front frame and the rear frame for unfolding and folding, wherein the side frame at least comprises a front top rod, a front bottom rod, a rear top rod, a rear bottom rod, a front inclined rod, a rear inclined rod, and a pivoting mechanism;

a front end of each of the front top rod and the front bottom rod is respectively pivotally connected to an upper side and a lower side of the front frame, a rear end of each of the rear top rod and the rear bottom rod is respectively pivotally connected to an upper side and a lower side of the rear frame, a rear end of the front bottom rod is pivotally connected to a front end of the rear bottom rod, a front end of the front inclined rod is pivotally connected to the lower side of the front frame, and a rear end of the rear inclined rod is pivotally connected to the lower side of the rear frame; and the pivoting mechanism is respectively connected to a rear end of the front top rod, a front end of the rear top rod, a rear end of the front inclined rod, and a front end of the rear inclined rod, and enables the four to be pivotally connected to each other;

wherein the rear inclined rod is provided with a folding hook, the front inclined rod is provided with a folding buckle, and when the folding cart is in a folded state, the folding hook can be locked on the front inclined rod through the folding buckle, enabling the folding cart to be kept in the folded state.

* * * * *